(12) United States Patent
Lin

(10) Patent No.: US 7,545,769 B2
(45) Date of Patent: Jun. 9, 2009

(54) MOBILE HANDOFF FUNCTIONALITY USING ASYNCHRONOUS CHANNEL IN A COMMUNICATION SYSTEM

(75) Inventor: Harn-Jier Lin, Lisle, IL (US)

(73) Assignee: Motorola, Inc., Schaumburg, IL (US)

( * ) Notice: Subject to any disclaimer, the term of this patent is extended or adjusted under 35 U.S.C. 154(b) by 487 days.

(21) Appl. No.: 11/421,807

(22) Filed: Jun. 2, 2006

(65) Prior Publication Data

US 2007/0281698 A1    Dec. 6, 2007

(51) Int. Cl.
*H04W 4/00*    (2009.01)
(52) U.S. Cl. .................. 370/328; 455/436; 455/444; 455/446
(58) Field of Classification Search ............. 370/328; 455/436, 444, 446
See application file for complete search history.

(56) References Cited

U.S. PATENT DOCUMENTS

| | | | |
|---|---|---|---|
| 6,078,570 A * | 6/2000 | Czaja et al. | ............ 370/331 |
| 6,459,689 B1 | 10/2002 | Czaja et al. | |
| 6,724,738 B1 | 4/2004 | Storm et al. | |
| 6,937,583 B1 * | 8/2005 | Czaja et al. | ............ 370/331 |
| 7,039,410 B2 | 5/2006 | Jovanovic | |
| 7,089,007 B2 * | 8/2006 | Wakuta et al. | ............ 455/436 |
| 2005/0288049 A1 * | 12/2005 | Gill et al. | ............ 455/518 |

FOREIGN PATENT DOCUMENTS

EP    1109418 A2    6/2001

* cited by examiner

*Primary Examiner*—Nick Corsaro
*Assistant Examiner*—Amanuel Lebassi
(74) *Attorney, Agent, or Firm*—Brian M. Mancini

(57) ABSTRACT

A apparatus and method for using an asynchronous channel for mobile handoff in a communication system includes a first step of operating a mobile unit on a forward link channel and a reverse link channel, wherein the forward and reverse link channels are different. A next step includes dropping the forward link while maintaining a connection to the reverse link channel. A next step includes acquiring a pilot signal of a new forward link channel targeted for handoff while maintaining the previous reverse link channel. A next step includes measuring a pilot signal power level of the targeted channel. A next step includes re-acquiring the previous forward link. A next step includes reporting the pilot signal power level of the targeted channel on the re-acquired forward link.

2 Claims, 2 Drawing Sheets

MOBILE HANDOFF FUNCTIONALITY USING ASYNCHRONOUS CHANNEL IN A COMMUNICATION SYSTEM

FIELD OF THE INVENTION

The present invention relates generally to wireless communication systems, and more particularly to mobile handoff functionality using an asynchronous channel in a communication system, such as a code division multiple access (CDMA) cellular telephone system.

BACKGROUND OF THE INVENTION

Direct sequence code division multiple access (DS-CDMA) communication systems are for use in cellular telephone systems with traffic channels located at 800 MHz and in the personal communication system (PCS) frequency band at 1800 MHz. In a DS-CDMA system, all base stations in all cells may use the same radio frequency for communication. One known DS-CDMA system is defined in Telecommunications Industry Association/Electronic Industry Association (TIA/EIA) Interim Standard IS-95, "Mobile Station-Base Station Compatibility Standard for Dual-Mode Wideband Spread Spectrum Cellular System" (IS-95).

In addition to traffic channels, each base station broadcasts a pilot channel, a synchronization channel, and a paging channel. The pilot channel or pilot signal is a pseudorandom noise or PN code. The pilot channel is commonly received by all mobile stations within range and is used by the mobile station for identifying the presence of a CDMA system, initial system acquisition, idle mode hand-off, identification of initial and delayed rays of communicating and interfering base stations, and for coherent demodulation of the synchronization, paging, and traffic channels.

The pilot signal transmitted by each base station in the system uses the same PN code but with a different phase offset. The base stations are uniquely identified by using a unique starting phase or starting time for the PN sequences. For example, in IS-95, the sequences are of length $2^{15}$ chips and are produced at a chip rate of 1.2288 Mega-chips per second and thus repeat every 26⅔ milliseconds. The minimum time separations are 64 chips in length allowing a total of 512 different PN code phase assignments for the base stations.

At the mobile station, the received RF signals include pilot, synchronization, paging, and traffic channels from all nearby base stations. The mobile station must search for pilot signals with the strongest pilot channel. If a mobile station is not on the strongest pilot channel, the mobile station is a candidate for handoff.

Idle hand-off is the process of attaching to and listening to the paging channel of the base station with the strongest pilot as identified by the pilot search. When the mobile station receives a page or accesses the system to place a call, it is important that the mobile station is listening to the page from or tries to access the base station associated with the strongest received pilot. This requires a fast pilot phase searching element, particularly when the mobile station is in motion. The searching element needs to be nimble, that is, able to look across the entire phase space as well as looking only at specific PN offsets. Unfortunately, the long times of the prior art searching mechanism adversely affects the soft handoff performance of the mobile station.

New requirements for mobile stations will require Mobile Assisted Hard Handoff, or MAHHO, capabilities. In current IS-95B/IS-2000, MAHHO functionality requires the mobile station to change the frequency of the radio link as it is handed off from one base station to another. Due to the full duplex nature of the CDMA air interface, this requires breaking the radio link, going to another frequency, looking for pilot signals, measuring the target channel forward link RF quality, returning to the original frequency and reacquiring the pilot to reestablish the link. Depending on the number of PNs and/or search window size, this procedure could take several frames (typical six or seven frames but could be as long as fifteen frame) to acquire a pilot signal, which is unsuitable for MAHHO purposes.

Moreover, in MAHHO, the mobile would determine when to leave the current channel to perform candidate search on target channel. As a result, the infrastructure may not know the timing for when the mobile leaves the source channel. Therefore, after the mobile leaves the source channel, the infrastructure may think there is bad reverse link, and would raise the reverse link power control loop set point unnecessarily. When the mobile returns to the serving channel, it needs to reacquire the forward link before turning on reverse link. Since there is no forward power control during MAHHO period, the base station may not be transmitting with the appropriate power, and since the reverse link is not turned on, the mobile unit can not control the forward link power to help the forward link acquisition either. If the forward link is not acquired in time, a drop call will be experienced.

Accordingly there is a need for fast and accurate pilot signal acquisition that will improve mobile station performance, particularly in a DS-CDMA system during hard handoff.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE EMBODIMENT

Figure 1:
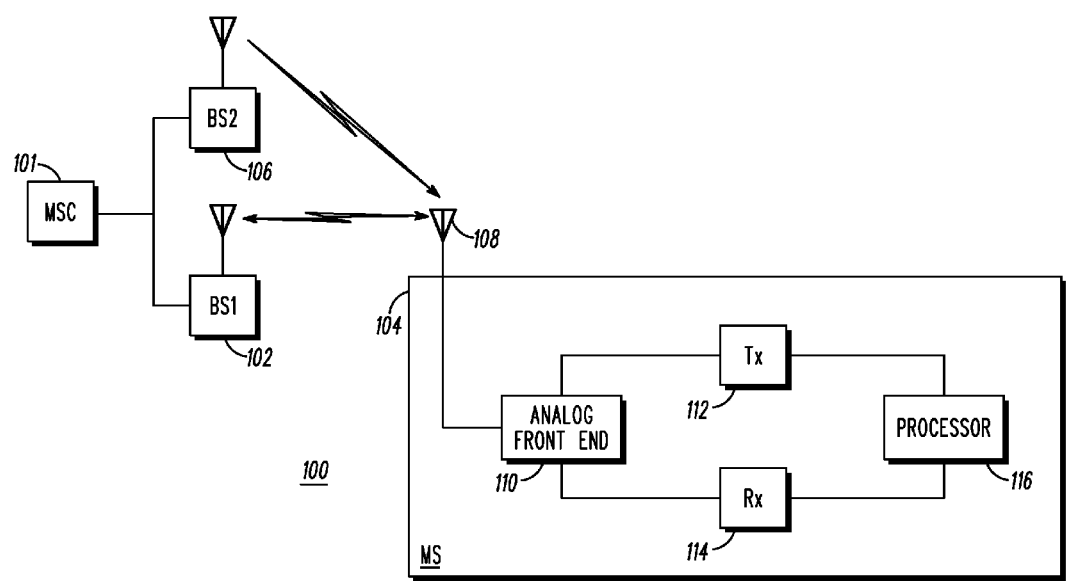
FIG. 1 is a block diagram of a communication system, in accordance with the present invention.

Referring now to FIG. 1, a communication system 100 includes a plurality of base stations 102, 106 configured for radio communication with one or more mobile stations such as mobile station 104. The mobile station 104 is configured to receive and transmit direct sequence code division multiple access (DS-CDMA) signals to communicate with the plurality of base stations, including base station 102. In the illustrated embodiment, the communication system 100 operates according to TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other DS-CDMA systems including PCS systems at 1800 MHz or with any other suitable DS-CDMA system. Although the description herein is particularly suited for CDMA networks, it is envisioned that the present invention can be utilized in many other communication system employing handoff modes, such as UMTS, TDMA, GSM, and the like.

The base station 102 transmits spread spectrum signals to the mobile station 104. The symbols on the traffic channel are spread using a Walsh code in a process known as Walsh covering. Each mobile station such as the mobile station 104 is assigned a unique Walsh code by the base station 102 so that the traffic channel transmission to each mobile station is orthogonal to traffic channel transmissions to every other mobile station. Communications between particular base stations and mobile stations is determined by a mobile switching center 101 (MSC), as is known in the art.

In addition to traffic channels, each base station broadcasts a pilot channel, a synchronization channel and a paging channel. The pilot channel is formed using an all-zero data sequence that is covered by Walsh code 0, which consists of all zeros. The pilot channel is commonly received by all mobile stations within range and is used by the mobile station 104 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the base station 102 to mobile stations including the mobile station 104.

In addition to the Walsh covering, all channels transmitted by the base station are spread using a pseudorandom noise (PN) sequence, also referred to as the pilot sequence. All base stations in the communication system 100 are uniquely identified by using a unique starting phase, also referred to as a starting time or phase shift, for the pilot channel sequence. The spread pilot channel modulates a radio frequency (RF) carrier and is transmitted to all mobile stations including the mobile station 104 in a geographic area served by the base station 102. The PN sequence is complex in nature, comprising both in-phase (I) and quadrature (Q) components. It will be recognized by those ordinarily skilled in the art that all processing of the pilot signal described herein involves both I and Q components, as is known in the art.

The mobile station 104 comprises an antenna 108, an analog front end 110 that can include a tunable duplexer, a receiver 114 (Rx) operable on a forward link (downlink) channel and that can include an analog-to-digital converter, a rake receiver and a searcher receiver, a transmitter 112 (Tx) transmitter operable on a reverse link (uplink) channel and that can include a digital-to-analog converter, and a processor 116 for controlling the transceiver and digitally processing signals, as are known in the art. It should be recognize that the description herein has been much simplified so as to not unduly complicate the drawing figure, and that many of the blocks described can be broken down in various different modules as is known in the art.

The antenna 108 receives pilot RF signals from the base station 102 and from other base stations 106 in the vicinity. Received pilot RF signals are converted to electrical signals by the antenna 108 and provided to the analog front end 110. The analog front end 110 filters the signals and the receiver 114 converts the signals to streams of digital data for further processing by the processor 116, as is known in the art.

Each base station 102 controls a transmit power level of mobile stations under its domain. This is done using a power control loop that compares a measured power level against a power control setpoint to control Tx power, as is known in the art. If a mobile station's power level exceeds the power control setpoint, then the mobile station lowers its Tx power. If a mobile station's power level is less than the power control setpoint, then the mobile station raises its Tx power. Each host base station 102 also directs its mobile stations 104 to periodically measure pilot signals from other base stations 106 for hand off purposes.

The searcher receiver of the receiver detects pilot signals received by the mobile station 104 from the plurality of base stations 102, 106. The searcher receiver despreads pilot signals using a correlator with PN codes generated in the mobile station 104. A quality and/or power level of the pilot signals of the various local base stations 102, 106 can be transmitted back to a host base station 102 through the transmitter 112 of the mobile unit 104, for handoff purposes. This information is passed to the MSC 101 which transfers communication from one base station 102 to a targeted handoff base station 106 for ultimate delivery to the mobile station 104.

As a mobile station moves away from its host base station 102 towards a neighboring base station 106, the pilot signal of the host base station will become weaker than the pilot signal of the neighboring base station, indicating a need to handoff the mobile station 104 to the neighboring base station 106. One technique for determining when a handoff should be performed uses the Mobile Assisted Hard Hand Off (MAHHO) protocol (used in the IS-95 communication system). MAHHO provides that a host base station can request a mobile station to perform pilot signal measurements on the host base station pilot signal and also on other pilots of a candidate target frequency. The host base station can direct the mobile station to either provide a one time measurement or periodic measurements. In either case, the mobile station makes RF quality and/or power level measurement of the pilot signals, which are then transmitted to the host base station. The host base station then communicates (through the MSC) with a potential target base station having a strong pilot signal (based on the mobile station's measurements) to provide a channel for hard handoff, if available.

The particular pilot signals for the mobile station to measure are provided by a candidate neighbor list provided by the host base station or pre-determined by the mobile station. In practice, the mobile station cannot only measure a pilot power level, but can also measure a bit error rate (BER), frame error rate (FER), block error rate (BLER), and the like, on a traffic channel. These quality measurements are transmitted to the host base station, ranked in order, processed for handoff acceptability, and passed to the MSC for a determination as to the best handoff candidate.

Figure 2:
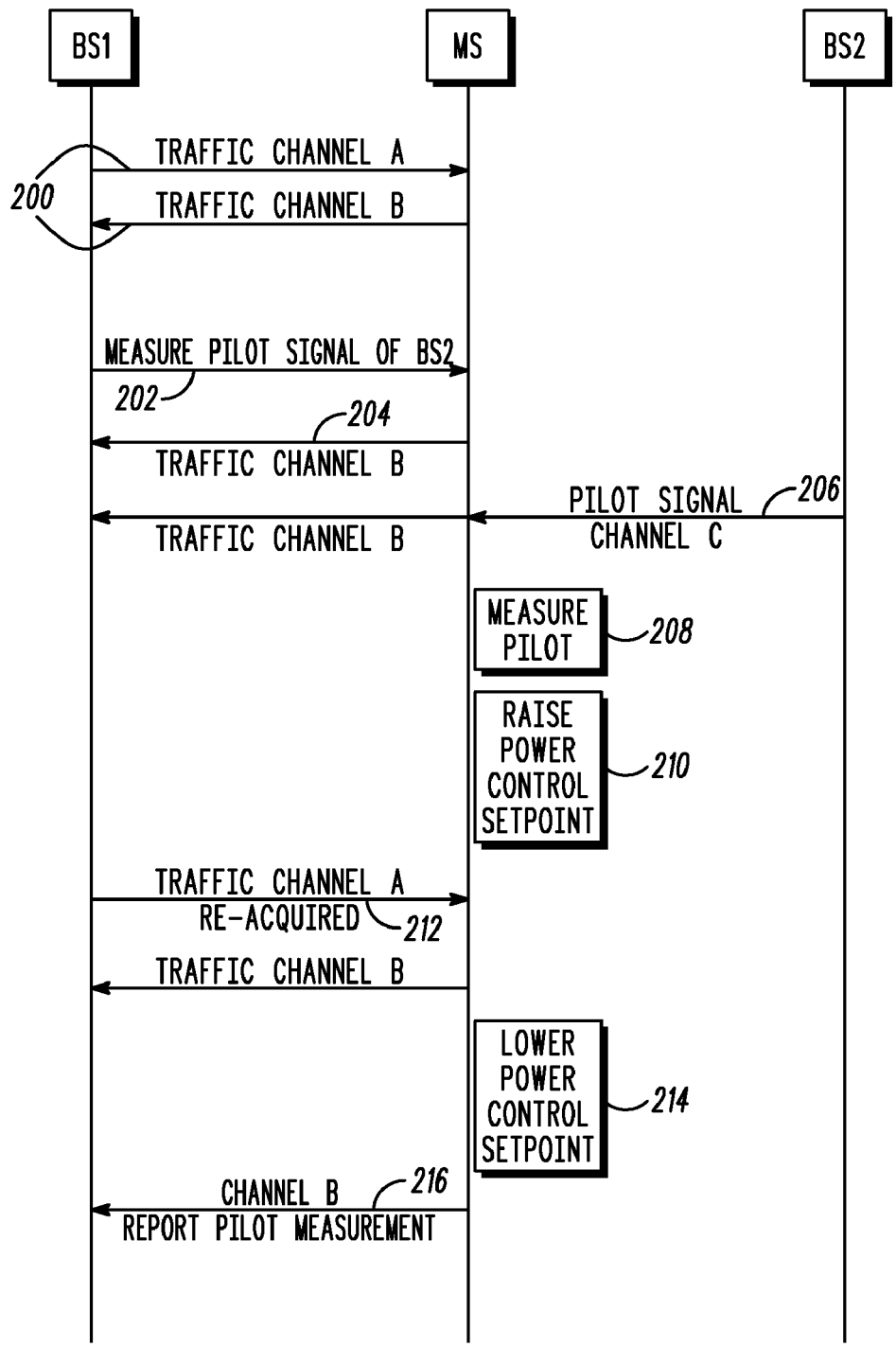
FIG. 2 is a flow diagram illustrating a method of operating the mobile station of FIG. 1.

FIG. 2 is a diagram illustrating a method for operating the mobile station 104 of FIG. 1 for acquiring a pilot signal in a CDMA receiver using a MAHHO protocol, in accordance with the present invention. A novel aspect of the present invention is operating 200 a mobile station (MS) to receive on a forward link (downlink channel A) traffic channel from a base station (BS1) asynchronously and transmit on a reverse link (uplink channel B) traffic channel to the base station (BS1), where the forward and reverse link channels are different. This mode of operation can be undertaken by the MS processor without external instructions, or it can be directed to operate in this mode by the communication system (e.g. BS or MSC).

Under the MAHHO protocol, the MS would receive 202 a command to measure a pilot signal (e.g. determine a pilot power level) of a BS2 channel that is targeted for handoff. The MS processor proceeds to direct the receiver to drop 204 the forward link (channel A) while having the transmitter maintain a connection to the reverse link channel (channel B). The mobile would continue to use the reverse link. The BS1 would continue to decode the reverse link. As such, the reverse link communication is not interrupted. The MS decides when to drop the forward link channel, unbeknownst to BS1, and switch to a new targeted forward link channel. The MS processor proceeds to direct the receiver to acquire 206 a pilot signal of a new forward link channel (C) from BS2 targeted for handoff, while having the transmitter maintain the previous reverse link channel (B) to BS1. The MS processor then directs the receiver to measure (208) the pilot signal (e.g. power level) of the targeted channel (C) from BS2.

At this point the MS attempts to return to BS1 to report its measurement results. However, since BS1 does not know when MS has disconnected the source channel (A), BS1 may believe that there is bad reverse link (B), and will raise the reverse link power control loop setpoint unnecessarily. When the MS returns to the serving traffic channel, it needs to reacquire the forward link (A) before engaging the reverse link (B). Since there is no forward power control during MAHHO period, the base station may not be transmitting with the appropriate power, and since the reverse link is not engaged, the mobile unit can not control the forward link power to help the forward link acquisition either. If the forward link is not acquired in time, a dropped call will be experienced. Therefore, at this point the MS processor raises 210 a forward link power control setpoint to assist with a quick forward link restoration and improve the probability of re-acquiring 212 the previous forward link. Since the reverse link remains active, the mobile would be able to control the previous forward link power to assist in re-acquiring the forward link. Upon re-acquisition, the MS processor immediately lowers 214 the forward link power control setpoint to normal operation, to limit interference, and directs the transmitter to report 216 the pilot signal power level of the targeted channel to BS1 on the reverse link channel (B).

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for using an asynchronous channel for mobile handoff in a Code Division Multiple Access communication system, the method comprising the steps of:
    operating a mobile unit on a forward link channel and a reverse link channel asynchronously, wherein the forward and reverse link channels are different;
    receiving a command to determine a pilot power level of a channel targeted for handoff;
    dropping the forward link from a serving base station by a decision of the mobile unit without contacting the serving base station while maintaining a connection to the reverse link channel with the serving base station;
    acquiring a pilot signal of a new forward link channel targeted for handoff by a decision of the mobile unit while maintaining the previous reverse link channel with the serving base station;
    measuring a pilot signal power level of the targeted channel;
    raising a forward link power control setpoint for the serving base station by the mobile unit to improve the probability of re-acquiring the previous forward link;
    re-acquiring the previous forward link;
    lowering the forward link power control setpoint for the serving base station to normal operation by the mobile unit upon re-acquisition of the previous forward link; and
    reporting the pilot signal power level of the targeted channel on the re-acquired forward link.

2. A mobile unit using an asynchronous channel for mobile handoff in a Code Division Multiple Access communication system, the mobile unit comprising:
    a transmitter operable on a reverse link channel;
    a receiver operable on a forward link channel and to receive a command to determine a pilot power level of a channel targeted for handoff; and
    a processor, the processor configured to direct the receiver and transmitter to operate on different channels asynchronously, the processor further configured to direct the receiver to drop the forward link without contacting a serving base station while having the transmitter maintain a connection to the reverse link channel with the serving base station, the processor further configured to; direct the receiver to acquire a pilot signal of a new forward link channel targeted for handoff while maintaining the previous reverse link channel with the serving base station, measure a pilot signal power level of the targeted channel, raise a forward link power control setpoint for the serving base station to improve the probability of re-acquiring the previous forward link, re-acquire the previous forward link, and lower the forward link power control setpoint for the serving base station to normal operation upon re-acquisition of the previous forward link, wherein the processor is configured to direct the transmitter to report the pilot signal power level of the targeted channel on reverse link.

* * * * *